US011370496B2

(12) United States Patent
Rowe et al.

(10) Patent No.: US 11,370,496 B2
(45) Date of Patent: Jun. 28, 2022

(54) PROGRAMMABLE TEXTURE SURFACES HAVING ARTIFICIAL MUSCLES

(71) Applicant: TOYOTA MOTOR ENGINEERING & MANUFACTURING NORTH AMERICA, INC., Plano, TX (US)

(72) Inventors: Michael P. Rowe, Pinckney, MI (US); Jillian M. Jakubiec, Bloomfield Hills, MI (US); Madison Emmett, Boulder, CO (US); Shardul Panwar, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 287 days.

(21) Appl. No.: 16/778,314

(22) Filed: Jan. 31, 2020

(65) Prior Publication Data

US 2021/0237809 A1 Aug. 5, 2021

(51) Int. Cl.
*B62D 35/00* (2006.01)
*B62D 29/00* (2006.01)
(Continued)

(52) U.S. Cl.
CPC .............. *B62D 35/00* (2013.01); *B60R 16/03* (2013.01); *B62D 29/001* (2013.01); *G05B 19/042* (2013.01); *G05B 2219/23444* (2013.01)

(58) Field of Classification Search
CPC ...... B62D 35/00; B62D 29/001; B60R 16/03; G05B 19/042; G05B 2219/2344
See application file for complete search history.

(56) References Cited

U.S. PATENT DOCUMENTS 6,376,971 B1 * 4/2002 Pelrine .................. F04B 35/045
310/363
6,586,859 B2 7/2003 Kornbluh et al.
(Continued)

FOREIGN PATENT DOCUMENTS

CN 207382213 U 5/2018
CN 209812321 U 12/2019
(Continued)

OTHER PUBLICATIONS

Li, et al., Fluid-driven origami-inspired artificial muscles (https://www.pnas.org/content/114/50/13132) Published: Nov. 27, 2017.
(Continued)

*Primary Examiner* — Lori L Lyjak
(74) *Attorney, Agent, or Firm* — Dinsmore & Shohl LLP

(57) ABSTRACT

A programmable texture surface including one or more artificial muscles is provided. Each artificial muscle includes a housing having a first wall opposite a second wall and an electrode region adjacent an expandable fluid region. One or both of the first wall and the second wall include an interior tapered portion within the electrode region. A dielectric fluid is housed within the housing and an electrode pair is housed within the electrode region of the housing. The electrode pair includes a first electrode coupled to the first wall and a second electrode coupled to the second wall, such that at least one of the first electrode and the second electrode is coupled to the interior tapered portion. The electrode pair is actuatable between a non-actuated state and an actuated state such that actuation from the non-actuated state to the actuated state directs the dielectric fluid into the expandable fluid region.

20 Claims, 7 Drawing Sheets

(51) Int. Cl.
*G05B 19/042* (2006.01)
*B60R 16/03* (2006.01)

(56) References Cited

U.S. PATENT DOCUMENTS

| | | | |
|---|---|---|---|
| 7,679,261 | B2 | 3/2010 | Chappaz et al. |
| 7,813,047 | B2 | 10/2010 | Wang et al. |
| 8,237,324 | B2 | 8/2012 | Pei et al. |
| 8,485,581 | B2 | 7/2013 | McKnight et al. |
| 8,779,646 | B2 | 7/2014 | Hino et al. |
| 9,602,641 | B2 | 3/2017 | Kim et al. |
| 10,233,910 | B2 | 3/2019 | Mazzeo et al. |
| 2005/0288597 | A1 | 12/2005 | Kishimoto et al. |
| 2010/0109486 | A1* | 5/2010 | Polyakov ............. H01L 41/29 310/365 |
| 2010/0268121 | A1* | 10/2010 | Kilborn ............. A61G 7/057 600/587 |
| 2016/0321880 | A1 | 11/2016 | Hamam et al. |
| 2019/0126516 | A1 | 5/2019 | Pikul et al. |
| 2021/0075344 | A1* | 3/2021 | Ludois ............. H02N 1/002 |

FOREIGN PATENT DOCUMENTS

| | | | |
|---|---|---|---|
| EP | 0924033 | A2 | 6/1999 |
| EP | 1221180 | B1 | 7/2002 |
| GB | 2563896 | B | 7/2019 |
| JP | 2007097259 | A | 4/2007 |
| JP | 2007097292 | A | 4/2007 |
| JP | 2012044447 | A | 3/2012 |
| JP | 6207478 | B2 | 11/2014 |
| JP | 6102610 | B2 | 3/2017 |
| KR | 20070119985 | A | 12/2007 |
| KR | 20090068130 | A | 6/2009 |
| KR | 20160117658 | A | 10/2016 |
| WO | 2011054394 | A | 5/2011 |
| WO | 2015023803 | A1 | 2/2015 |
| WO | 2018175744 | A1 | 9/2018 |
| WO | 2018232386 | A1 | 12/2018 |
| WO | 2019002860 | A1 | 1/2019 |
| WO | 2019173227 | A1 | 9/2019 |

OTHER PUBLICATIONS

Pikul, et al., Stretchable surfaces with programmable 3D texture morphing for synthetic amouflaging skins (https://science.sciencemag.org/content/358/6360/210). Published: Oct. 13, 2017.
Ceron, et al., Fiber embroidery of self-sensing soft actuators (https://www.mdpi.com/2313-7673/3/3/24/htm). Published: Sep. 4, 2018.
Cao, et al., Development of a soft untethered robot using artificial muscle actuators (https://www.spiedigitallibrary.org/conference-proceedings-of-spie/10163/101631X/Development-of-a-soft-untethered-robot-using-artificial-muscle-actuators/10.1117/12.2260375.short?SSO=1). Published: Apr. 17, 2017.
Acome, et al., Hydraulically amplified self-healing electrostatic actuators with muscle-like performance, Keplinger Science, Jan. 5, 2018; vol. 359, Issue 6371, pp. 61-65.
Shane Mitchell, et al., "An Easy-To-Implement Toolkit To Create Versatile and High-Performance HASEL Actuators For Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-voltage-is_fig1_333725822, 15 pages.

* cited by examiner

PROGRAMMABLE TEXTURE SURFACES HAVING ARTIFICIAL MUSCLES

TECHNICAL FIELD

The present specification generally relates to apparatus and methods for modifying an interior surface or an exterior surface of a vehicle and, more specifically, apparatus and methods for providing programmable vehicle surface disturbances for improving aerodynamics of the vehicle.

BACKGROUND

High wind conditions increase the difficulty in handling a vehicle. As such, the exterior contour of the vehicle is constructed to withstand extreme crosswinds and improve aerodynamic capabilities by reducing drag. For example, additional structures such as spoilers and air dams may be added to a vehicle to reduce drag and disrupt unfavorable air movement across a body surface of the vehicle. Providing these surface disturbances is beneficial in high wind driving conditions, but may not be desired in other conditions. Therefore, such surface disturbances should be capable of operating only in certain conditions or at certain times.

Accordingly, a need exists for alternative devices for on demand modification of a surface, such as a vehicle surface.

SUMMARY

In one embodiment, a programmable texture surface includes one or more artificial muscles. Each artificial muscle includes a housing having a first wall opposite a second wall and an electrode region adjacent an expandable fluid region. One or both of the first wall and the second wall include an interior tapered portion within the electrode region. A dielectric fluid is housed within the housing and an electrode pair is housed within the electrode region of the housing. The electrode pair includes a first electrode coupled to the first wall and a second electrode coupled to the second wall, such that at least one of the first electrode and the second electrode is coupled to the interior tapered portion. The electrode pair is actuatable between a non-actuated state and an actuated state such that actuation from the non-actuated state to the actuated state directs the dielectric fluid into the expandable fluid region.

In another embodiment, a vehicle includes an exterior vehicle surface and a programmable texture surface provided on the exterior vehicle surface. The programmable texture surface includes one or more artificial muscles. Each artificial muscle includes a housing having a first wall opposite a second wall and an electrode region adjacent an expandable fluid region. One or both of the first wall and the second wall include an interior tapered portion within the electrode region. A dielectric fluid is housed within the housing and an electrode pair is housed within the electrode region of the housing. The electrode pair includes a first electrode coupled to the first wall and a second electrode coupled to the second wall, such that at least one of the first electrode and the second electrode is coupled to the interior tapered portion. The electrode pair is actuatable between a non-actuated state and an actuated state such that actuation from the non-actuated state to the actuated state directs the dielectric fluid into the expandable fluid region.

In yet another embodiment, a method for providing a textured surface on a vehicle includes positioning a programmable texture surface on an interior vehicle surface or an exterior vehicle surface. The programmable texture surface includes one or more artificial muscles. Each artificial muscle includes a housing having a first wall opposite a second wall and an electrode region adjacent an expandable fluid region. One or both of the first wall and the second wall include an interior tapered portion within the electrode region. A dielectric fluid is housed within the housing and an electrode pair is housed within the electrode region of the housing. The electrode pair includes a first electrode coupled to the first wall and a second electrode coupled to the second wall, wherein at least one of the first electrode and the second electrode is coupled to the interior tapered portion. The electrode pair is actuatable between a non-actuated state and an actuated state such that actuation from the non-actuated state to the actuated state directs the dielectric fluid into the expandable fluid region. The method further includes operating the electrode pair of the one or more artificial muscles between a non-actuated state and an actuated state such that actuation from the non-actuated state to the actuated state directs the dielectric fluid into the expandable fluid region.

In yet another embodiment, a method of actuating a programmable texture surface positioned on a vehicle includes generating a voltage using a power supply electrically coupled to an electrode pair of one or more artificial muscles of the programmable texture surface. Each artificial muscle includes a housing having a first wall opposite a second wall and an electrode region adjacent an expandable fluid region. One or both of the first wall and the second wall include an interior tapered portion within the electrode region. A dielectric fluid is housed within the housing. The electrode pair is positioned in the electrode region of the housing. In addition, the electrode pair includes a first electrode coupled to the first wall and a second electrode coupled to the second wall, at least one of the first electrode and the second electrode is coupled to the interior tapered portion. The method also includes applying the voltage to the electrode pair of the one or more artificial muscles, thereby actuating the electrode pair from a non-actuated state and an actuated state such that the dielectric fluid is directed into the expandable fluid region of the housing, expanding the expandable fluid region.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
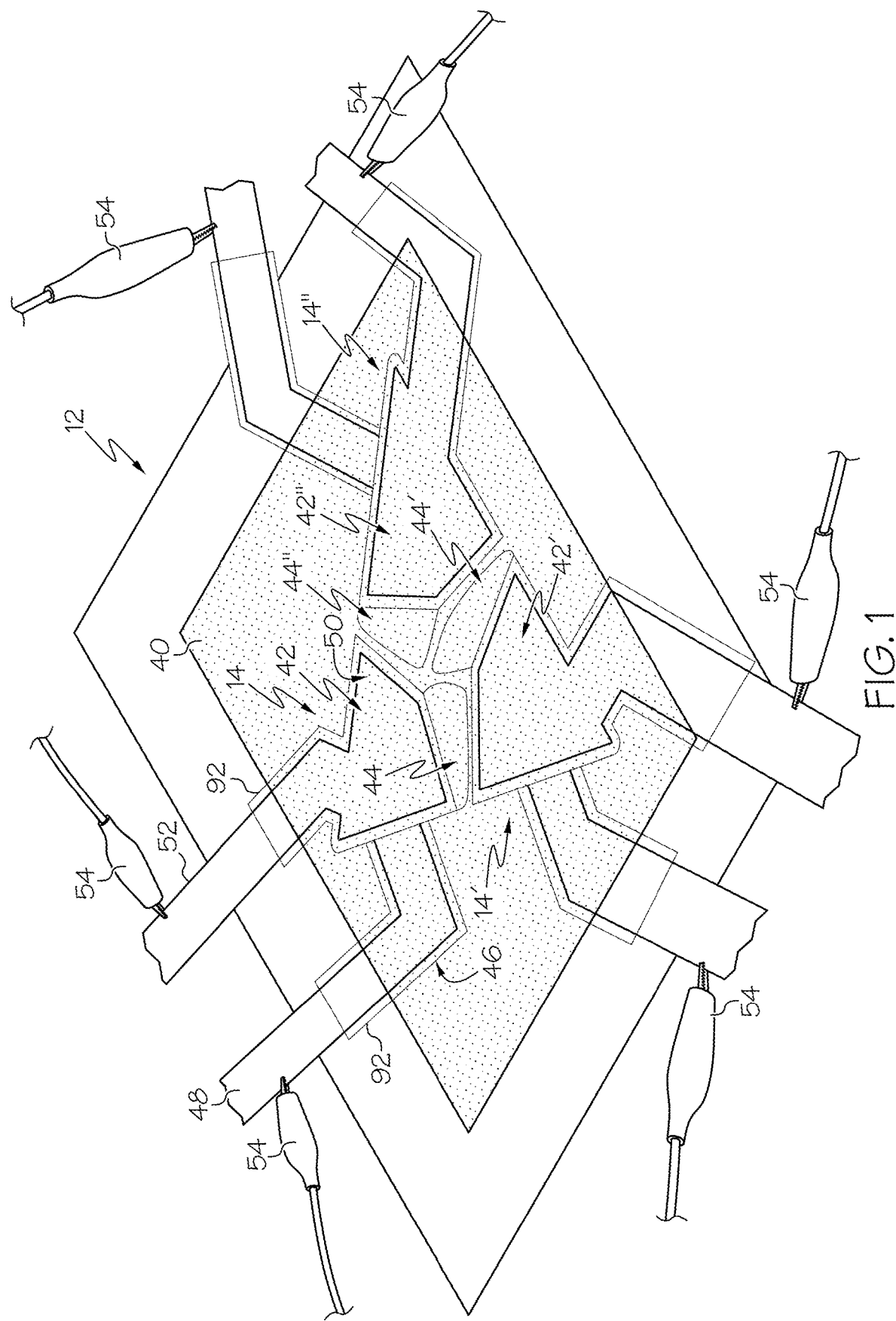
FIG. 1 schematically depicts a perspective view of an example programmable texture surface including a plurality of artificial muscles in a non-actuated state, according to one or more embodiments shown and described herein.

Embodiments described herein are directed to a programmable texture surface that includes at least one artificial muscle, which is actuatable to selectively raise and lower a region of the programmable textured surface to provide a selective, on demand textured surface. The programmable textured surface includes at least one artificial muscle including a housing having a first wall opposite a second wall, at least one of which includes an interior tapered portion. The housing includes an electrode region adjacent an expandable fluid region, a dielectric fluid housed within the housing, and an electrode pair housed within the electrode region of the housing. The electrode pair includes a first electrode coupled to the first wall and a second electrode coupled to the second wall. At least one of the first electrode and the second electrode is coupled to the interior tapered portion on either the first wall or the second wall. The electrode pair is actuatable between a non-actuated state and an actuated state such that actuation from the non-actuated state to the actuated state directs the dielectric fluid into the expandable fluid region. This expands the expandable fluid region, raising a portion of the programmable textured surface on demand. Thus, actuation of the electrode pair forms a textured surface that may be used in a variety of settings, such as on the exterior of a vehicle to provide aerodynamic stability or on the exterior or interior of a vehicle to form a decorative feature. Various embodiments of the programmable texture surface and the operation of the programmable texture surface are described in more detail herein. Whenever possible, the same reference numerals will be used throughout the drawings to refer to the same or like parts.

Figure 2:
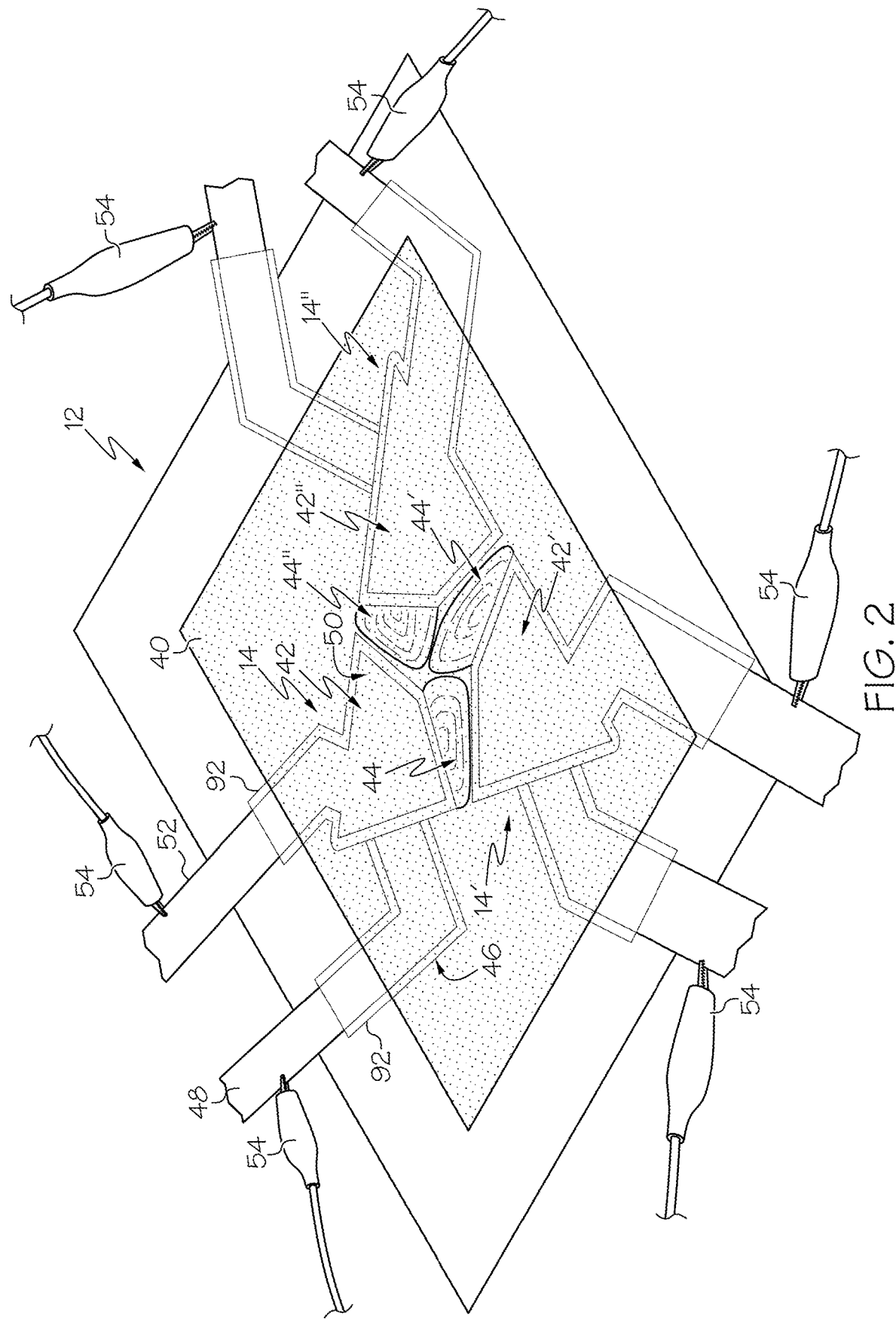
FIG. 2 schematically depicts a perspective view of the programmable texture surface of FIG. 1 in an actuated state, according to one or more embodiments shown and described herein.

Referring now to FIGS. 1 and 2, a programmable texture surface 12 is shown that includes three artificial muscles 14, 14', 14". In particular, FIG. 1 depicts the artificial muscles 14, 14', 14" in a non-actuated state and FIG. 2 depicts the artificial muscles 14, 14', 14" in an actuated state. As shown, the artificial muscles 14, 14', 14" are arranged in a three-pointed star configuration. The particular arrangement of the artificial muscles 14, 14', 14" forming a three-pointed star configuration is only illustrative of one specific arrangement and not intended to be limiting. As such, other arrangements of the programmable texture surface 12 are contemplated to include any number of artificial muscles 14 of varying shapes and sizes in any arrangement. An outer cover layer 40 is provided over each of the artificial muscles 14, 14', 14" to provide the appearance of an integrally formed and uniform outer surface of the programmable texture surface 12.

Each artificial muscle 14 has an electrode region 42 adjacent an expandable fluid region 44. In the non-actuated state, shown in FIG. 1, the electrode region 42 has a height substantially equal to a height of the expandable fluid region 44. Similarly, the electrode regions 42', 42" and the expandable fluid regions 44', 44" of the other artificial muscles 14', 14", respectively, are also substantially equal in height when in the non-actuated state. Thus, the outer cover layer 40 forms a planar upper surface when in the non-actuated state. It is to be appreciated that the artificial muscles 14, 14', 14" have substantially similar structure. Thus, only the artificial muscle 14 will be described in detail herein.

Referring now to FIGS. 1-4, the artificial muscle 14 includes a first electrode 46 having a first tail 48 and a second electrode 50 having a second tail 52. The first tail 48 and the second tail 52 extend from the electrode region 42 out of the artificial muscle 14. In order to prevent leakage of fluid out of the artificial muscle 14, the artificial muscle 14 may be sealed using an adhesive or any other suitable means. The tails 48, 52 are coupled, either directly or in series, to a power supply 22 and a controller 18 of an actuation system 200 (FIG. 7) via a plurality of connectors 54. It should be noted that the first electrode 46 and the second electrode 50 are stacked such that the first electrode 46 is positioned under the second electrode 50. Thus, only the first tail 48 of the first electrode 46 extending out from under the second electrode 50 is shown in FIGS. 1 and 2.

As shown in FIG. 2, in the three-pointed star arrangement, the expandable fluid regions 44, 44', 44" of the artificial muscles 14, 14', 14" are brought into proximity with one another to provide the appearance of an integrally formed three-pointed star raised surface when the individual artificial muscles 14, 14', 14". As discussed in more detail below, when in the actuated state, the electrode regions 42, 42', 42" of the artificial muscles 14, 14', 14" are compressed, thereby displacing a fluid from the electrode region 42, 42', 42" to the expandable fluid region 44, 44', 44". Thus, as shown in FIG. 2, the expandable fluid region 44, 44', 44" of each artificial muscle 14, 14', 14" is shown as being inflated to a height higher than a height of the electrode region 42, 42', 42" in order to present the three-pointed star raised surface collectively formed by the artificial muscles 14, 14', 14".

Figure 3:
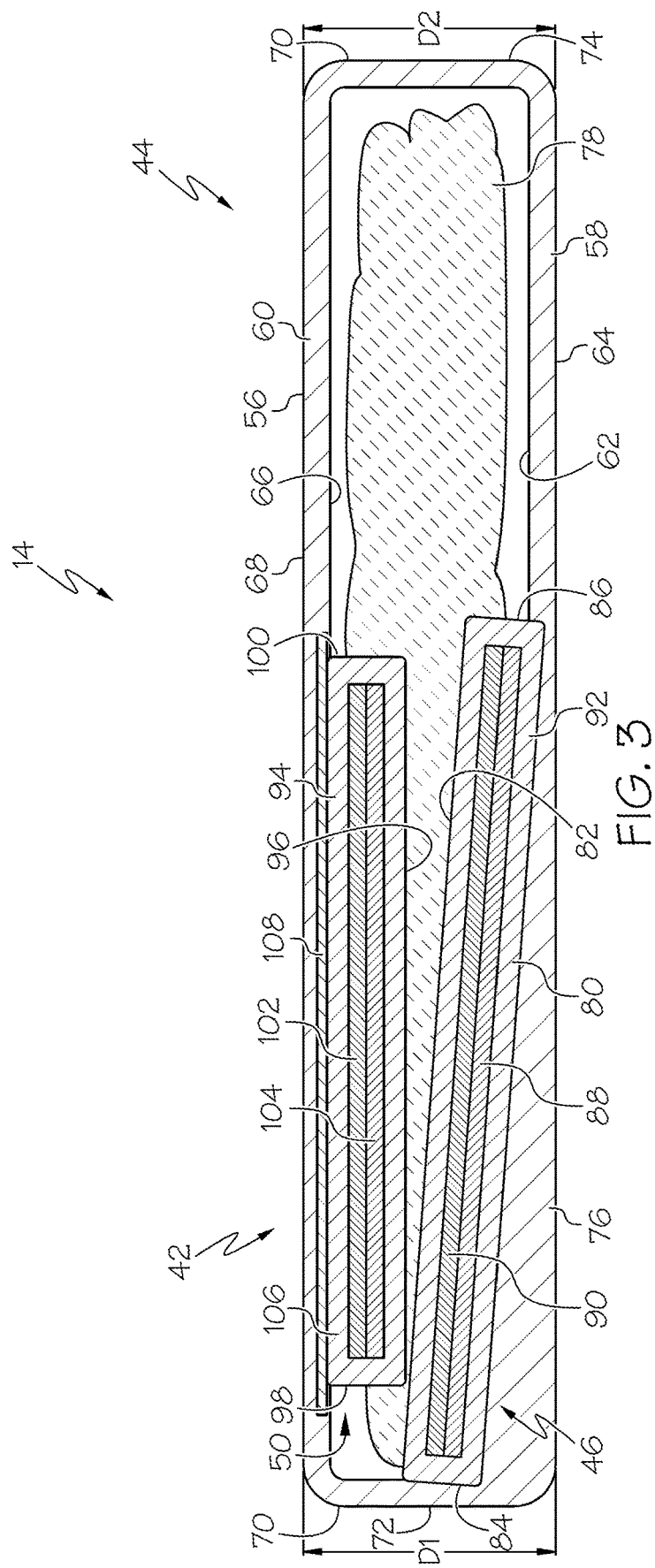
FIG. 3 schematically depicts a cross-sectional view of an artificial muscle of the programmable texture surface of FIGS. 1 and 2 in the non-actuated state, according to one or more embodiments shown and described herein.
Figure 7:
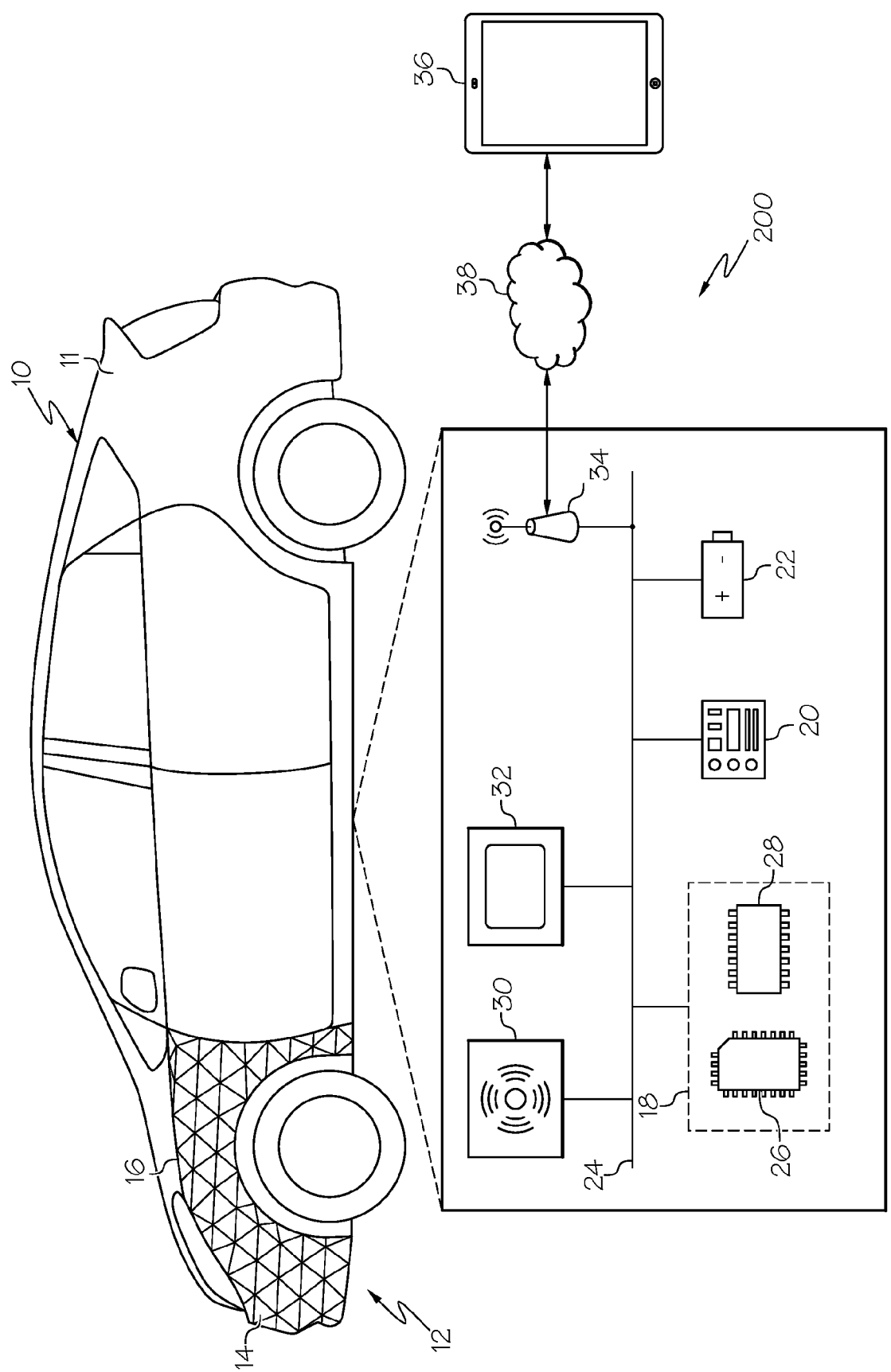
FIG. 7 schematically depicts a system for operating the programmable texture surface provided on a vehicle, according to one or more embodiments shown and described herein.

Now referring to FIG. 3, a cross-sectional view of the artificial muscle 14 in the non-actuated state is illustrated. As noted above, in some embodiments, the artificial muscles 14, 14', 14" are substantially similar in structure in order to form a tessellation pattern on an exterior surface 11 of a vehicle 10 (FIG. 7). Therefore, only the artificial muscle 14 will be described in detail herein.

The artificial muscle 14 includes a housing 56 having a first wall 58 and an opposite second wall 60. The first wall 58 includes an interior surface 62 and an opposite exterior surface 64. Similarly, the second wall 60 includes an interior surface 66 and an opposite exterior surface 68. The artificial muscle 14 includes at least one side wall 70 based on the geometry of the artificial muscle 14 for interconnecting the first wall 58 and the second wall 60 to enclose the housing 56. As shown, the artificial muscle 14 includes at least one side wall 70 extending around a perimeter of the artificial muscle 14 for joining the first wall 58 and the second wall 60. In some embodiments the housing 56 comprises a flexible material and is a flexible housing. For example, the flexible housing may comprise an elastomeric material such that it is an elastomeric housing. The housing 56 also has a first end 72 at which the electrode region 42 is provided and an opposite second end 74 at which the expandable fluid region 44 is provided.

In an embodiment, as shown in FIG. 3, the first wall 58 has an interior tapered portion 76 to provide an interior slope within the housing 56. As shown, the interior tapered portion 76 extends from the first end 72 of the housing 56 toward the second end 74 thereof. The interior tapered portion 76 has a thickness that is greater proximate the first end 72 of the housing 56 as compared to the thickness of the interior tapered portion 76 at a point distal from the side wall 70 and the first end 72. The interior tapered portion 76 may be integrally formed with the first wall 58 or, in some embodiments, it may be an additional structural component fixed to the first wall 58 to provide a sloped surface. As shown in FIG. 3, the interior tapered portion 76 is integrally formed with the first wall 58 in order to raise the interior surface 62 of the first wall 58 within the electrode region 42 toward the opposite second wall 60 and slope the interior surface 62 toward the second end 74 of the housing 56. In this embodiment, the interior surface 66 of the second wall 60 is extended closer to the first wall 58 within the electrode region 42 and sloped to provide a greater thickness at the first end 72 of the housing 56 as opposed to the thickness of the interior tapered portion 76 at a point distal the first end 72.

In the non-actuated state, the exterior surface 64 of the first wall 58 and the exterior surface 68 of the second wall 60 are both planar and substantially parallel to one another. More particularly, a first distance D1 between the exterior surface 64 of the first wall 58 and the exterior surface 68 of the second wall 60 within the electrode region 42 is substantially equal to a second distance D2 between the exterior surface 64 of the first wall 58 and the exterior surface 68 of the second wall 60 within the expandable fluid region 44.

A dielectric fluid 78 is provided within the housing 56 and sealed therein. A "dielectric" fluid as used herein is a medium or material that transmits electrical force without conduction and as such has low electrical conductivity. As discussed in more detail below, the dielectric fluid 78 flows freely between the first end 72 and the second end 74 of the housing 56. Some non-limiting example dielectric fluids include perfluoroalkanes, transformer oils, and deionized water.

A pair of electrodes 46, 50, including the first electrode 46 and the second electrode 50, are provided within the electrode region 42 of the housing 56 and fixed therein proximate the first end 72 and the side wall 70. One of the first electrode 46 and the second electrode 50 is a negatively charged electrode and the other of the first electrode 46 and the second electrode 50 is a positively charged electrode. For purposes discussed herein, either electrode 46, 50 may be positively charged so long as the other electrode 46, 50 within the artificial muscle 14 is negatively charged.

Referring still to FIG. 3, the first electrode 46 has first surface 80, a second surface 82, a first end 84, and a second end 86. The first electrode 46 includes an inner polymer film 88 proximate the first surface 80 of the first electrode 46 and a flexible metal film 90 proximate the opposite second surface 82 of the first electrode 46 and on the inner polymer film 88. The inner polymer film 88 functions as a backing for the flexible metal film 90. In some embodiments, the inner polymer film 88 comprises polyester and the flexible metal film 90 comprises aluminum. However, it should be understood that any suitable polymers and metals for forming an electrode are contemplated. The first electrode 46 also includes a polymer cover coating 92 wrapped around the inner polymer film 88 and the flexible metal film 90. The polymer cover coating 92 may comprise a different polymer than the inner polymer film 88. For example, in some embodiments, the polymer cover coating 92 comprises a polyimide having a silicone adhesive surface, such as Kapton tape.

Once wrapped by the polymer cover coating 92, the first surface 80 of the first electrode 46 is coupled to the interior surface 62 of the first wall 58 by any suitable means, such as an adhesive or the like. Due to the first electrode 46 being provided on the interior surface 62 of the first wall 58 and, thus, on the interior tapered portion 76, the first electrode 46 is positioned to be slanted with respect to the second electrode 50 and the second wall 60. Although not shown in FIG. 3, the tail 48, shown in FIGS. 1 and 2, is also wrapped with the polymer cover coating 92 and extends from the first electrode 46 out of the first end 72 of the housing 56.

The second electrode 50 is substantially similar in structure to the first electrode 46. As such, the second electrode 50 has a first surface 94, a second surface 96, a first end 98, and a second end 100. The second electrode 50 includes an inner polymer film 102 proximate the first surface 94 of the second electrode 50 and a flexible metal film 104 proximate the opposite second surface 96 of the second electrode 50 and on the inner polymer film 102. The inner polymer film 102 functions as a backing for the flexible metal film 104. In some embodiments, the inner polymer film 102 comprises polyester and the flexible metal film 104 comprises aluminum. However, it should be understood that any suitable polymers and metals for forming an electrode are contemplated. The second electrode 50 also includes a polymer cover coating 106 wrapped around the inner polymer film 102 and the flexible metal film 104. The polymer cover coating 106 may comprise a different polymer than the inner polymer film 102. For example, in some embodiments, the polymer cover coating 106 comprises a polyimide having a silicone adhesive surface, such as Kapton tape.

Once wrapped by the polymer cover coating 106, the first surface 94 of the second electrode 50 is coupled to the interior surface 66 of the second wall 60 within the electrode region 42 by any suitable means, such as an adhesive or the like. Contrary to the first electrode 46 being positioned within the housing 56 at a slant due to the position of the interior tapered portion 76, the second electrode 50 is fixed to the second wall 60 and substantially parallel thereto. In some embodiments, a stiffening film 108 is provided between the second electrode 50 and the second wall 60. The stiffening film 108 provides rigidity for at least a portion of the second wall 60 when operating between the non-actuated state and the actuated state and the second electrode 50 is moved toward the first electrode 46 and the first wall 58. In some embodiments, the stiffening film 108 may be an acetate film. Although not shown in FIG. 3, the tail 52, shown in FIGS. 1 and 2, is also wrapped with the polymer cover coating 106 and extends from the second electrode 50 out of the first end 72 of the housing 56.

In addition, the first electrode 46 and the second electrode 50 are arranged such that a distance between the first end 84 of the first electrode 46 and the first end 98 of the second electrode 50 is less than a distance between the second end 86 of the first electrode 46 and the second end 100 of the second electrode 50. This positions the first electrode 46 and the second electrode 50 in an acute or V-shape configuration. As a result, when actuated, the electrodes 46, 50 are configured to zipper toward one another, pushing the dielectric fluid 78 toward the expandable fluid region 44 and the second end 74 of the housing 56.

Figure 4:
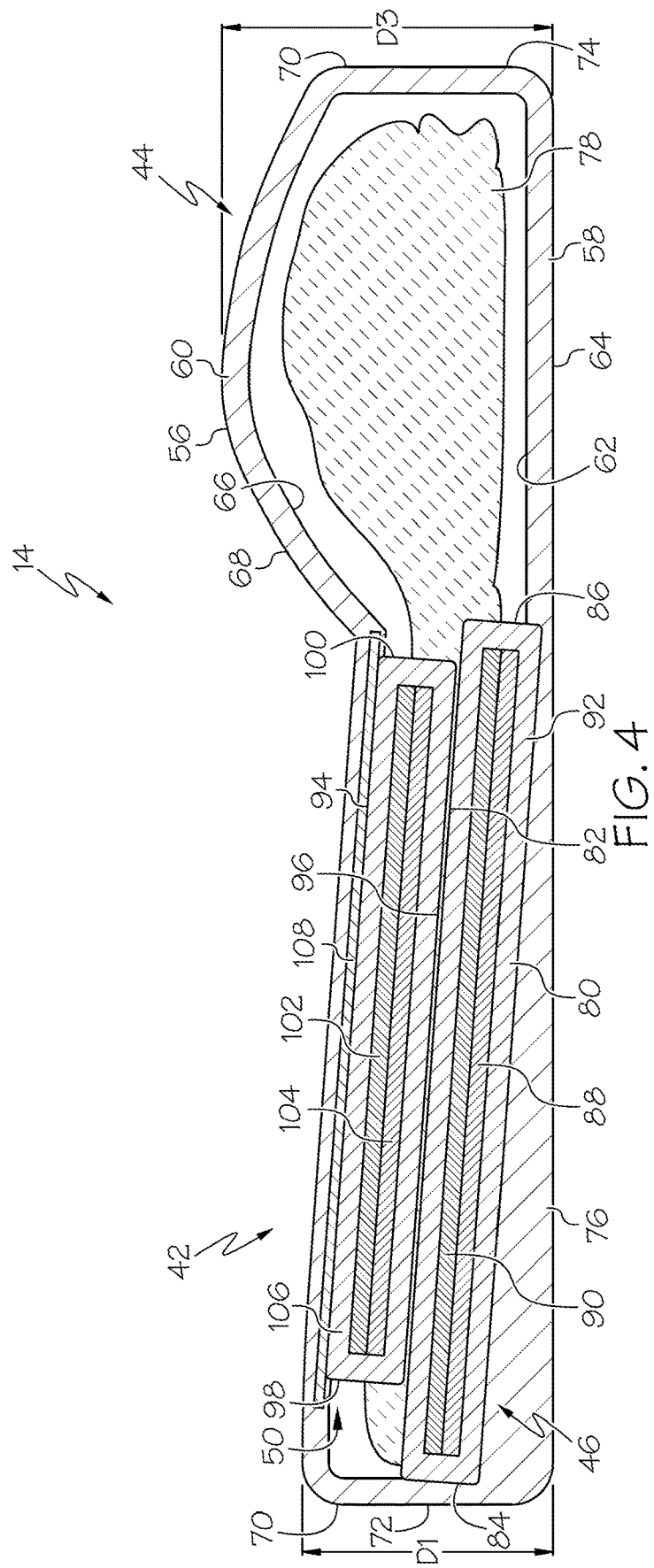
FIG. 4 schematically depicts a cross-sectional view of an artificial muscle of the programmable texture surface of FIGS. 1 and 2 in the actuated state, according to one or more embodiments shown and described herein.

Referring now to FIG. 4, the artificial muscle 14 is shown in the actuated state. As shown, the first electrode 46 and the second electrode 50 are brought into contact with one another. Thus, the first electrode 46 and the second electrode 50 are now substantially parallel to one another. However, when in the actuated state, the exterior surface 68 of the second wall 60 of the housing 56 within the electrode region 42 is not parallel to the exterior surface 64 of the first wall 58. More particularly, the first distance D1 between the exterior surface 64 of the first wall 58 and the exterior surface 68 of the second wall 60 within the electrode region 42 is less than a third distance D3 between the exterior surface 64 of the first wall 58 and the exterior surface 68 of the second wall 60 within the expandable fluid region 44. The difference between the second distance D2 and the third distance D3 defines the amount of expansion of the second wall 60 of the housing 56 within the expandable fluid region 44 by the displaced dielectric fluid 78.

In order to move the first electrode 46 and the second electrode 50 toward one another, a voltage is applied. In some embodiments, a voltage of up to 10 kV may be provided from the power supply 22 to induce an electric field through the dielectric fluid 78. The resulting attraction between the first electrode 46 and the second electrode 50 pushes the dielectric fluid 78 from the first end 72 of the housing 56 toward the second end 74 and into the expandable fluid region 44. Pressure from the dielectric fluid 78 against the second wall 60 of the housing 56 in the expandable fluid region 44 causes the second wall 60 to deform (i.e., expand). Once the voltage being supplied to the first electrode 46 and the second electrode 50 is discontinued, the electrodes 46, 50 return to their initial, non-parallel position and the exterior surface 68 of the second wall 60 and the exterior surface 64 of the first wall 58 returns to their parallel position.

Without intending to be limited by theory, the size of the electrodes 46, 50 is proportional to the amount of displacement of the dielectric fluid 78. Therefore, when greater displacement of the dielectric fluid 78 is desired in order to deform the second wall 60 of the housing 56 to a greater degree, the size of the electrodes 46, 50 is increased relative to the size of the expandable fluid region 44.

Figure 5:
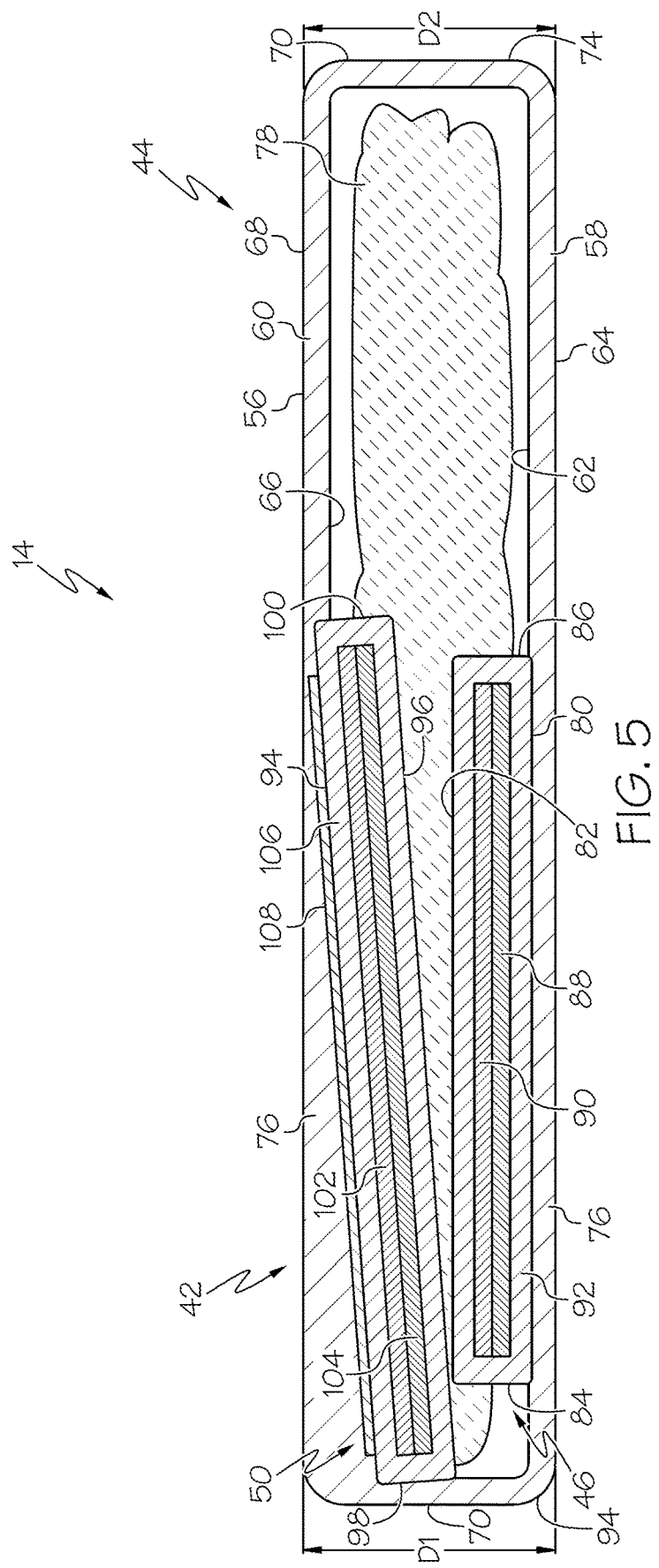
FIG. 5 schematically depicts a cross-sectional view of an artificial muscle of an example programmable texture surface in the non-actuated state, according to one or more embodiments shown and described herein.
Figure 6:
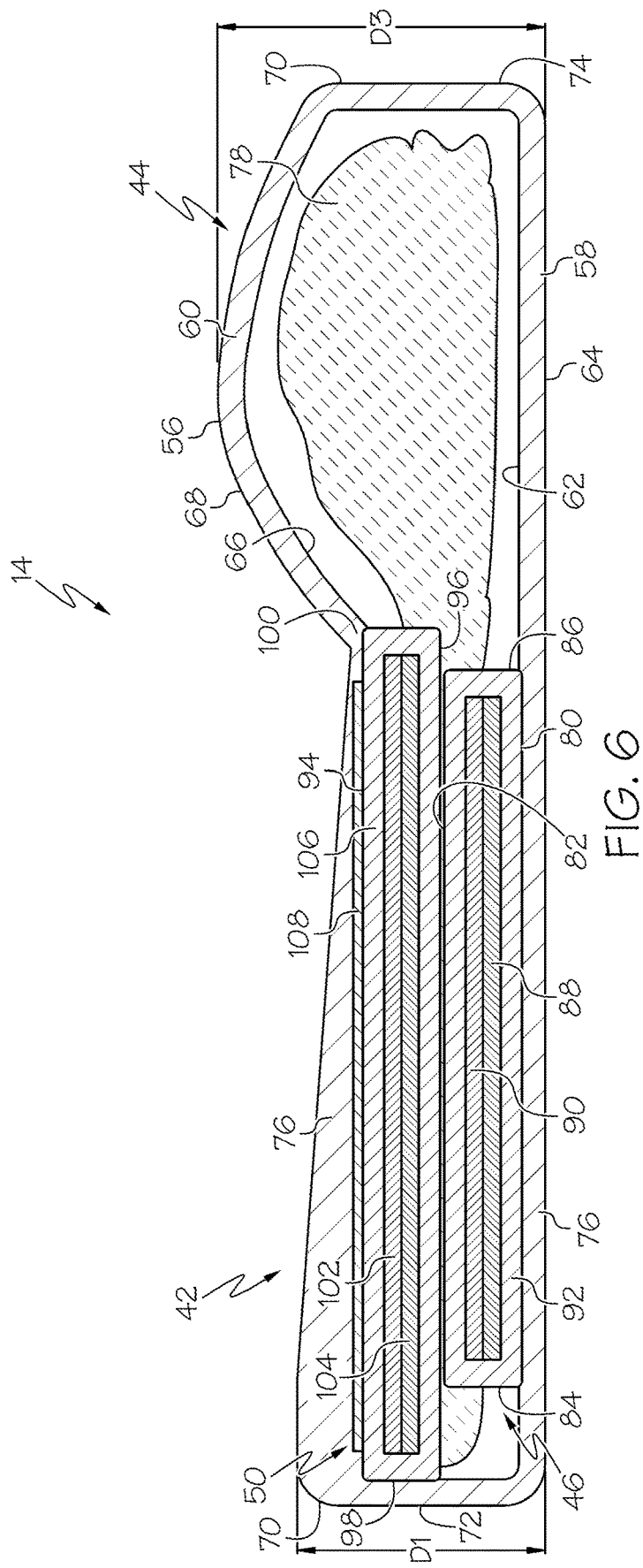
FIG. 6 schematically depicts a cross-sectional view of an artificial muscle of the programmable texture surface of FIG. 5 in the actuated state, according to one or more embodiments shown and described herein.

In another embodiment, as shown in FIGS. 5 and 6, the interior tapered portion 76 is provided on the second wall 60 of the housing 56. All other parts of the embodiment remain the same and, thus, like parts will be referred to with like reference numerals. In this embodiment, and specifically in the non-actuated state as shown in FIG. 5, the interior tapered portion 76 extends from the first end 72 of the housing 56 toward the second end 74 thereof. The interior tapered portion 76 has a thickness that is greater proximate the first end 72 of the housing 56 as compared to the thickness of the interior tapered portion 76 at a point distal from the side wall 70 and the first end 72. The interior tapered portion 76 may be integrally formed with the second wall 60 or, in some embodiments, it may be an additional structural component fixed to the second wall 60 to provide a sloped surface. As shown in FIG. 5, the interior tapered portion 76 is integrally formed with the second wall 60 in order to lower the interior surface 66 of the second wall 60 within the electrode region 42 toward the opposite first wall 58 and slope the interior surface 66 toward the second end 74 of the housing 56. In this embodiment, the interior surface 66 of the second wall 60 is extended closer to the first wall 58 within the electrode region 42 and sloped to provide a greater thickness at the first end 72 of the housing 56 as opposed to the thickness of the interior tapered portion 76 at a point distal the first end 72.

Due to the second electrode 50 being provided on the interior surface 66 of the second wall 60 and, thus, on the interior tapered portion 76, the second electrode 50 is positioned to be slanted with respect to the first electrode 46 and the first wall 58. In this embodiment, the first electrode 46 is positioned to be parallel with respect to the first wall 58 of the housing 56. When in the actuated state, as shown in FIG. 6, the first electrode 46 and the second electrode 50 are parallel with one another. However, the exterior surface 64 of the first wall 58 and the exterior surface 68 of the second wall 60 are non-parallel.

In yet other embodiments, the interior tapered portion 76 is provided on both the interior surface 62 of the first wall 58 and the interior surface 66 of the second wall 60. In doing so, the overall thickness of the interior tapered portion 76 may be reduced by approximately half such that the first electrode 46 and the second electrode 50 remain in a V-shaped orientation when in the non-actuated state and parallel to one another when in the actuated state.

Referring now to FIG. 7, a vehicle 10 is illustrated according to one or more embodiments described herein. The vehicle 10, as shown, includes a plurality of exterior vehicle surfaces 11. In some embodiments, the programmable texture surface 12 including at least one artificial muscle 14 is provided on at least a portion of the exterior vehicle surfaces 11, such as a front corner panel 16 of the vehicle 10. In some embodiments, as shown in FIG. 7, a plurality of artificial muscles 14 form a singular programmable texture surface 12 on the front corner panel 16 of the vehicle 10 and are arranged in a tessellation pattern.

As discussed herein, the artificial muscle 14 is actuatable between the non-actuated state and the actuated state. In some embodiments, each artificial muscle 14 of the same programmable texture surface 12 is simultaneously actuated between the non-actuated state and an actuated state. However, it should be understood that actuation of different artificial muscles 14 of the same programmable texture surface 12 may be staggered or alternated. Thus, one or more artificial muscles 14 of the programmable texture surface 12 may be in the actuated state while one or more artificial muscles 14 remain in the non-actuated state.

In the non-actuated state, the artificial muscle 14 provides a planar surface extending substantially parallel to the front corner panel 16 of the vehicle 10. Thus, the programmable texture surface 12 has a uniform, planar outer surface extending substantially parallel to the front corner panel 16 of the vehicle 10 as well. The uniform, planar outer surface of the programmable texture surface 12 ensures that the aerodynamic properties of the vehicle 10 are not disturbed. In the actuated state, the artificial muscle 14 is partially inflated, as discussed herein, in order to enhance stability while driving. In particular, the inflated artificial muscle 14 provides disturbing vortices across the programmable texture surface 12 covering the front corner panel 16 of the vehicle 10. The inflation of the artificial muscle 14 and the vortices formed across the front corner panel 16 assist in providing enhanced stability to the vehicle 10 while driving in a crosswind.

The artificial muscle 14 may also be suitable for providing a decorative feature on an exterior surface or an interior surface of the vehicle 10. When located within an interior of the vehicle 10, the artificial muscle 14 may be provided on any suitable surface of the vehicle 10, such as, for example, the dashboard, a center console, side panels, or the like. Similarly, the artificial muscle 14 is operable between the non-actuated state and the actuated state as desired by a user or occupant of the vehicle 10. In some embodiments, when providing a decorative feature, a single artificial muscle 14, or a smaller array of artificial muscles 14 as compared to the array provided above on the entire front corner panel 16, may be secured to the exterior vehicle surface 11 of the vehicle 10. As such, the artificial muscle 14, either singly or in a plurality forming an array, may be actuated between the non-actuated state and the actuated state to provide the programmable texture surface 12 as a decorative inflatable display.

Referring still to FIG. 7, an actuation system 200 may be provided for operating the artificial muscle 14 of the programmable texture surface 12 between the non-actuated state and the actuated state. Thus, the actuation system 200 may include a controller 18, an operating device 20, a power supply 22, and a communication path 24. The various components of the actuation system 200 will now be described.

The controller 18 includes a processor 26 and a non-transitory electronic memory 28 to which various components are communicatively coupled. In some embodiments, the processor 26 and the non-transitory electronic memory 28 and/or the other components are included within a single device. In other embodiments, the processor 26 and the non-transitory electronic memory 28 and/or the other components may be distributed among multiple devices that are communicatively coupled. The controller 18 includes the non-transitory electronic memory 28 that stores a set of machine readable instructions. The processor 26 executes the machine readable instructions stored in the non-transitory electronic memory 28. The non-transitory electronic memory 28 may comprise RAM, ROM, flash memories, hard drives, or any device capable of storing machine readable instructions such that the machine readable instructions can be accessed by the processor 26. Accordingly, the actuation system 200 described herein may be implemented in any conventional computer programming language, as pre-programmed hardware elements, or as a combination of hardware and software components. The non-transitory electronic memory 28 may be implemented as one memory module or a plurality of memory modules.

In some embodiments, the non-transitory electronic memory 28 includes instructions for executing the functions of the actuation system 200. The instructions may include instructions for operating the artificial muscle 14 based on a user command or a signal from a condition detection sensor 30, such as a wind sensor, described below. The instructions for operating the artificial muscle 14, when executed by the processor 26, may individually operate multiple artificial muscles 14 based on a predetermined set of commands. When a plurality of artificial muscles 14 are provided on the exterior vehicle surface 11 of the vehicle 10, the memory 28 includes instructions for operating an individual artificial muscle 14 or an array of artificial muscles 14 independently of other arrays of artificial muscles 14 to form additional programmable texture surfaces. As such, the programmable texture surface 12 including a plurality of artificial muscles 14 provided on the front corner panel 16 of the vehicle 10 may be operated independently of a second programmable texture surface including a plurality of artificial muscles 14 provided on a different exterior vehicle surface 11 of the vehicle 10.

The processor 26 may be any device capable of executing machine readable instructions. For example, the processor 26 may be an integrated circuit, a microchip, a computer, or any other computing device. The non-transitory electronic memory 28 and the processor 26 are coupled to the communication path 24 that provides signal interconnectivity between various components and/or modules of the actuation system 200. Accordingly, the communication path 24 may communicatively couple any number of processors with one another, and allow the modules coupled to the communication path 24 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 7, the communication path 24 communicatively couples the processor 26 and the non-transitory electronic memory 28 of the controller 18 with a plurality of other components of the actuation system 200. For example, the actuation system 200 depicted in FIG. 7 includes the processor 26 and the non-transitory electronic memory 28 communicatively coupled with the operating device 20 and the power supply 22.

The operating device 20 allows for a user to control operation of the programmable texture surface 12, or plurality of programmable texture surfaces 12 when provided. In some embodiments, the operating device 20 may be a switch, toggle, button, or any combination of controls provided on or within the vehicle 10 to provide user operation. The controls of the operating device 20 may be incorporated into any existing control panel of the vehicle 10 or may be provided separately, such as on a door panel or a center console of the vehicle 10. As a non-limiting example, a user may control the programmable texture surface 12 to actuate the artificial muscle 14 into the actuated state by activating controls of the operating device 20 to a first position. While in the first position, the artificial muscle 14 will remain in the actuated state. The user may control the programmable texture surface 12 to switch the artificial muscle 14 into the non-actuated state by operating the controls of the operating device 20 out of the first position and into a second position.

The operating device 20 is coupled to the communication path 24 such that the communication path 24 communicatively couples the operating device 20 to other modules of the actuation system 200. The operating device 20 may provide a user interface for receiving user instructions as to a specific operating configuration of the programmable texture surface 12. The user instructions may include instructions to operate the programmable texture surface 12 only at certain times of the day. For example, the artificial muscle 14 of the programmable texture surface 12 may only be actuated to the actuated state during specific hours of the day, such as evening hours. In addition, user instructions may include instructions to operate the programmable texture surface 12 only at certain driving conditions. For example, the artificial muscle 14 may only be actuated to the actuated state while the vehicle 10 is traveling above or below a specific threshold speed. In addition, when a plurality of programmable texture surfaces 12 are provided on multiple exterior surfaces of the vehicle 10, the user instructions may include instructions specific to certain programmable texture surfaces 12. For example, the programmable texture surface 12 provided on one exterior vehicle surface 11 of the vehicle 10 may be instructed to operate during different conditions than a second programmable texture surface provided on another exterior vehicle surface 11 of the vehicle 10.

The power supply 22 (e.g., battery) provides power to the artificial muscle 14. In some embodiments, the power supply 22 is a rechargeable direct current power source separate from a battery of the vehicle 10 itself. It is to be understood that the power supply 22 may be a single power supply or battery for providing power to a plurality of artificial muscles 14 and a plurality of programmable texture surfaces 12. However, the power supply 22 may comprise a plurality of individual power storage devices when it is impracticable to interconnect each artificial muscle 14 or each programmable texture surface 12 to a single power supply 22. In another embodiment, the power supply 22 is the battery of the vehicle 10. In this embodiment, a power adapter (not shown) may be provided and electrically coupled via a wiring harness or the like for providing power to the artificial muscles 14 via the power supply 22.

In some embodiments, the actuation system 200 also includes a display device 32. The display device 32 is coupled to the communication path 24 such that the communication path 24 communicatively couples the display device 32 to other modules of the actuation system 200. The display device 32 may output a notification in response to an actuation state of the programmable texture surface 12 or indication of a change in the actuation state of the programmable texture surface 12 and/or each of the artificial muscles 14 of each programmable texture surface 12. In addition, when a plurality of programmable texture surfaces 12 are provided, the display device 32 may provide an indication of the actuation state of each of the programmable texture surfaces 12. Moreover, the display device 32 may be a touchscreen that, in addition to providing optical information, detects the presence and location of a tactile input upon a surface of or adjacent to the display device 32. Accordingly, the display device 32 may include the operating device 20 and receive mechanical input directly upon the optical output provided by the display device 32.

In some embodiments, the actuation system 200 also includes the condition detection sensor 30, as discussed herein. The condition detection sensor 30 is coupled to the communication path 24 such that the communication path 24 communicatively couples the condition detection sensor 30 to other modules of the actuation system 200. The condition detection sensor 30 may include any suitable sensor for detecting a driving condition, such as an anemometer, for example, for measuring wind speed. As noted above, the memory 28 may include instructions for operating the programmable texture surface 12 based on a driving condition of the vehicle 10. In some embodiments, the programmable texture surface 12 may operate when the condition detection sensor 30 detects, for example, a wind speed upon a predetermined threshold and the condition detection sensor 30 transmits a signal to the processor 26. The predetermined threshold may be preset at a default parameter or may be determined by a user via the operating device 20. As such, the user may indicate that the programmable texture surface 12 is to be operated when the condition detection sensor 30 detects a wind speed above 20 miles per hour (mph), 30 mph, 40 mph, etc. As noted above, providing a plurality of programmable texture surfaces 12 on different exterior vehicle surfaces 11 of the vehicle 10 may be suitable for improving aerodynamics during crosswinds. Thus, actuating the programmable texture surfaces 12 during high wind situations may improve driving handling of the vehicle 10.

In some embodiments, the actuation system 200 includes network interface hardware 34 for communicatively coupling the actuation system 200 to a portable device 36 via a network 38. The portable device 36 may include, without limitation, a smartphone, a tablet, a personal media player, or any other electric device that includes wireless communication functionality. It is to be appreciated that, when provided, the portable device 36 may serve to provide user commands to the controller 18, instead of the operating device 20. As such, a user may be able to control or set a program for controlling the programmable texture surface 12 without utilizing the controls of the operating device 20 in the vehicle 10 itself. Thus, the programmable texture surface 12 may be controlled remotely via the portable device 36 wirelessly communicating with the controller 18 via the network 38.

From the above, it is to be appreciated that defined herein is a programmable texture surface for providing a textured surface on an exterior surface or an interior surface of a vehicle by selectively actuating artificial muscles to raise and lower a region of the programmable textured surface. This provides a textured surface that may operate on demand and may be used in a variety of settings, such as on the exterior of a vehicle to provide aerodynamic stability or on the exterior or interior of a vehicle to form a decorative feature.

It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A programmable texture surface comprising:
one or more artificial muscles, each artificial muscle comprising:
a housing having a first wall opposite a second wall and an electrode region adjacent an expandable fluid region, wherein one or both of the first wall and the second wall include an interior tapered portion within the electrode region;
a dielectric fluid housed within the housing; and
an electrode pair housed within the electrode region of the housing, the electrode pair including a first electrode coupled to the first wall and a second electrode coupled to the second wall, such that at least one of the first electrode and the second electrode is coupled to the interior tapered portion,
wherein the electrode pair is actuatable between a non-actuated state and an actuated state such that actuation from the non-actuated state to the actuated state directs the dielectric fluid into the expandable fluid region.

2. The programmable texture surface of claim 1, wherein, when in the non-actuated state, an exterior surface of the first wall and an exterior surface of the second wall are parallel and the electrode pair is non-parallel.

3. The programmable texture surface of claim 1, wherein, when in the actuated state, an exterior surface of the first wall and an exterior surface of the second wall are non-parallel and the electrode pair is parallel.

4. The programmable texture surface of claim 1, further comprising an outer cover layer enveloping each of the one or more artificial muscles.

5. The programmable texture surface of claim 1, wherein the first electrode and the second electrode of the one or more artificial muscles include an inner polymer film and a metal film wrapped in a polymer cover coating.

6. The programmable texture surface of claim 1, wherein the housing is a flexible housing comprising an elastomeric material.

7. The programmable texture surface of claim 1, further comprising a stiffening film between one of the first or second electrodes and the housing.

8. The programmable texture surface of claim 1, further comprising a plurality of artificial muscles positioned in contact with one another.

9. The programmable texture surface of claim 1, further comprising a controller communicatively coupled to the electrode pair of the one or more artificial muscles, wherein the controller is configured to direct a voltage from a power supply across the first electrode and the second electrode of the one or more artificial muscles to actuate the one or more artificial muscles from the non-actuated state to the actuated state.

10. The programmable texture surface of claim 1, wherein the first wall comprises the interior tapered portion.

11. The programmable texture surface of claim 1, wherein the second wall comprises the interior tapered portion.

12. A vehicle comprising:
an exterior vehicle surface; and
a programmable texture surface provided on the exterior vehicle surface, the programmable texture surface including one or more artificial muscles, each artificial muscle comprising:
a housing having a first wall opposite a second wall and an electrode region adjacent an expandable fluid region, wherein one or both of the first wall and the second wall include an interior tapered portion within the electrode region;
a dielectric fluid housed within the housing; and
an electrode pair housed within the electrode region of the housing, the electrode pair including a first electrode coupled to the first wall and a second electrode coupled to the second wall, such that at least one of the first electrode and the second electrode is coupled to the interior tapered portion,
wherein the electrode pair is actuatable between a non-actuated state and an actuated state such that actuation from the non-actuated state to the actuated state directs the dielectric fluid into the expandable fluid region.

13. The vehicle of claim 12, wherein, when in the non-actuated state, an exterior surface of the first wall and an exterior surface of the second wall are parallel and the electrode pair is non-parallel and wherein, when in the actuated state, an exterior surface of the second wall and an exterior surface of the first wall are non-parallel and the electrode pair is parallel.

14. The vehicle of claim 12, wherein the first electrode and the second electrode each comprise an inner polymer film and a metal film, the first electrode and the second electrode each wrapped in a polymer cover coating.

15. The vehicle of claim 12, wherein the first electrode and the second electrode are configured to zipper when actuated.

16. A method of actuating a programmable texture surface positioned on a vehicle, the method comprising:
generating a voltage using a power supply electrically coupled to an electrode pair of one or more artificial muscles of the programmable texture surface, wherein:
each artificial muscle comprises a housing having a first wall opposite a second wall and an electrode region adjacent an expandable fluid region;
one or both of the first wall and the second wall include an interior tapered portion within the electrode region;
a dielectric fluid is housed within the housing;
the electrode pair is positioned in the electrode region of the housing; and
the electrode pair comprises a first electrode coupled to the first wall and a second electrode coupled to the second wall, at least one of the first electrode and the second electrode is coupled to the interior tapered portion; and
applying the voltage to the electrode pair of the one or more artificial muscles, thereby actuating the electrode pair from a non-actuated state and an actuated state such that the dielectric fluid is directed into the expandable fluid region of the housing, expanding the expandable fluid region.

17. The method of claim 16, wherein the programmable texture surface is positioned on an exterior surface of the vehicle.

18. The method of claim 16, wherein, when in the non-actuated state, an exterior surface of the second wall and an exterior surface of the first wall are parallel and the electrode pair is non-parallel.

19. The method of claim 16, wherein, when in the actuated state, an exterior surface of the second wall and an exterior surface of the first wall are non-parallel and the electrode pair is parallel.

20. The method of claim 16, wherein voltage is applied to the electrode pair in response to a wind speed measurement of a condition detection sensor communicatively coupled to one or more artificial muscles via a controller.

* * * * *